US012367251B2

(12) United States Patent
Leedekerken

(10) Patent No.: US 12,367,251 B2
(45) Date of Patent: Jul. 22, 2025

(54) BROWSER BASED ROBOTIC PROCESS AUTOMATION

(71) Applicant: William Dennis Leedekerken, Neptune Beach, FL (US)

(72) Inventor: William Dennis Leedekerken, Neptune Beach, FL (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/691,824

(22) Filed: Mar. 10, 2022

(65) Prior Publication Data

US 2023/0289389 A1      Sep. 14, 2023

(51) Int. Cl.
    *G06F 16/9535*      (2019.01)
    *G06F 16/9538*      (2019.01)

(52) U.S. Cl.
    CPC ...... *G06F 16/9535* (2019.01); *G06F 16/9538* (2019.01)

(58) Field of Classification Search
    CPC ..................... G06F 16/9535; G06F 16/9538
    See application file for complete search history.

(56) References Cited

U.S. PATENT DOCUMENTS

| | | | |
|---|---|---|---|
| 7,031,902 B1 * | 4/2006 | Catiller ................... | G06F 30/20 703/24 |
| 9,235,858 B1 * | 1/2016 | Singh ................. | G06Q 30/0625 |
| 2005/0278644 A1 * | 12/2005 | Greaves ............. | G06Q 30/0641 715/962 |
| 2011/0270867 A1 * | 11/2011 | Dettinger .............. | G06F 16/951 707/769 |
| 2014/0019426 A1 * | 1/2014 | Palmer .................. | G06F 16/256 707/694 |
| 2015/0058233 A1 * | 2/2015 | Budlong ................ | G06Q 50/16 705/315 |
| 2016/0179659 A1 * | 6/2016 | Champlin-Scharff ....................... | G06F 40/211 717/126 |
| 2016/0360298 A1 * | 12/2016 | Chalmers ............ | G06F 9/45512 |
| 2022/0029820 A1 * | 1/2022 | Mozano ................ | H04L 9/0891 |
| 2022/0035641 A1 * | 2/2022 | Singh .................... | G06F 3/0484 |
| 2022/0417024 A1 * | 12/2022 | Yee ....................... | H04L 9/3226 |

* cited by examiner

*Primary Examiner* — Ann J Lo
*Assistant Examiner* — Fatima P Mina
(74) *Attorney, Agent, or Firm* — Hickman Becker Bingham Ledesma LLP

(57) ABSTRACT

An approach is provided for browser based robotic process automation. A computing device accepts, via a user interface, a selection of a query and one or more services. The computing device sends a request identifying a user account and the one or more services. The computing device receives, in response to the request, automation code for accessing the one or more services. The computing device retrieves credentials for accessing the one or more services by the user account. The computing device executes the automation code to cause the user account to be authenticated at the one or more services using the credentials and to cause a search of the query to be performed at the one or more services. The computing device outputs a result of the automation code, the result corresponding to one or more matches of the search of the query at the one or more services.

20 Claims, 11 Drawing Sheets

FIG. 3

AUTOMATION SCRIPT PSEUDOCODE 300A

Name: get_images_by_id.script
Description: Retrieve images associated with product ID from image DB
Domains / Services: Website 190A
Parameters: "user credentials1", "search query"
Contextual Menu Entry Title: "Get Pictures"

310: Access Website 190A
312: Insert "user credentials1" into Text Entry Fields 260D, 260E
314: Click Button 280A
316: Click Button 280B
318: Insert "search query" into Text Entry Field 260F
320: Click Button 280D
322: Scrape each of the Image Thumbnail Links 290*
324: Generate a webpage with the full size scraped Images 295* in a grid
326: Display the generated webpage in a new browser tab
328: END

AUTOMATION SCRIPT PSEUDOCODE 300B

Name: show_me_results1.script
Description: Retrieve images, sales, datasheet associated with product ID
Domains / Services: Website 190A, 190B, 190C
Parameters: "user credentials1", "user credentials2", "user credentials3", "search query"
Contextual Menu Entry Title: "Show Me Results"

330: Execute "get_images_by_id.script" using "search query" and "user credentials1"
332: Execute "get_sales_by_id.script" using "search query" and "user credentials2"
334: Execute "get_datasheet_by_id.script" using "search query" and "user credentials3"
336: END

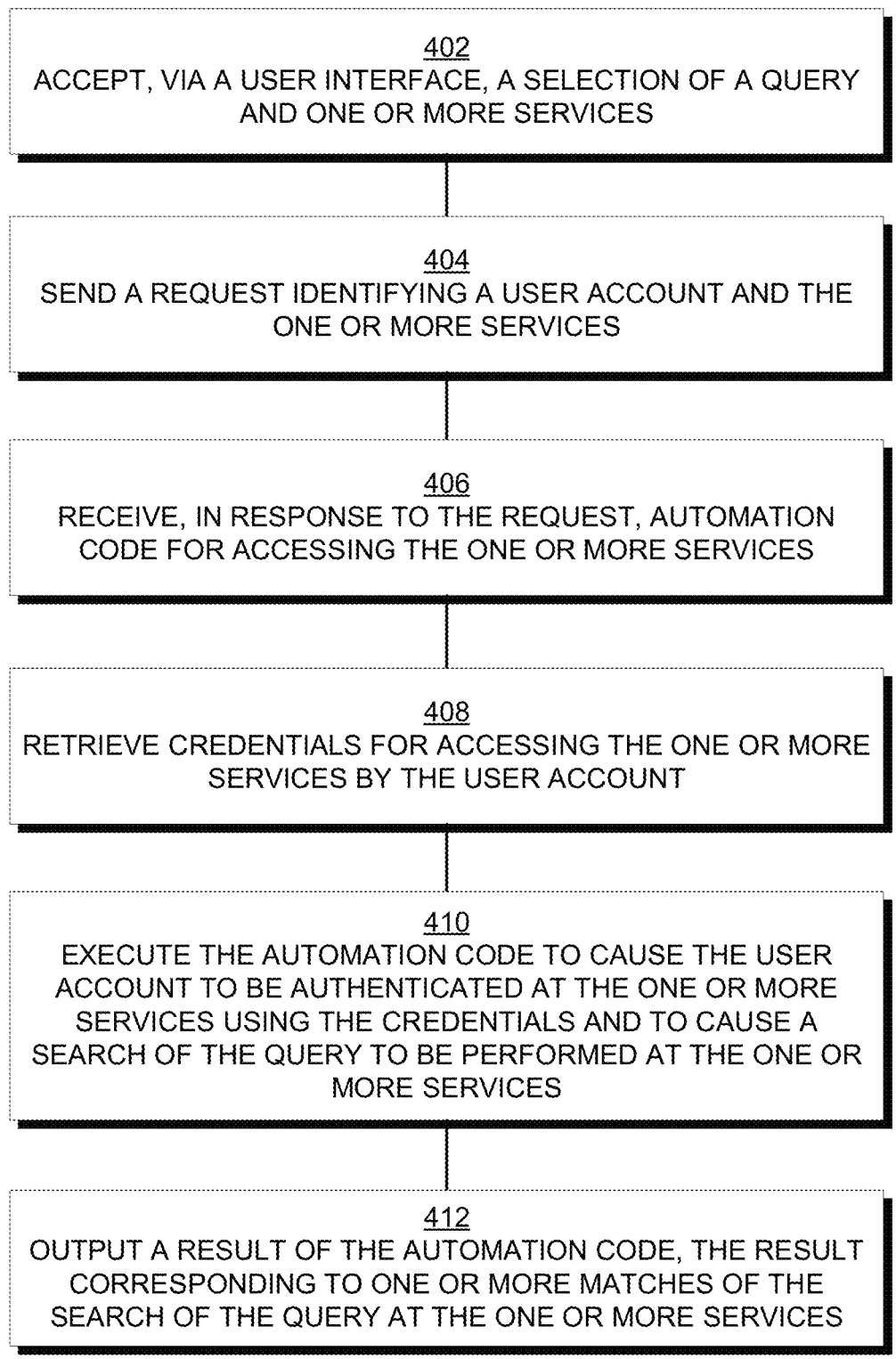

BROWSER BASED ROBOTIC PROCESS AUTOMATION

FIELD

The technical field of the present disclosure relates to robotic process automation, and more specifically to web browser based robotic process automation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

When performing business analytics, such as by using line of business (LOB) or customer relationship management (CRM) applications, users must often interact with several different application vendors using proprietary access systems with siloed data. In many situations, vendor support is unavailable to standardize and modernize these access systems, and therefore legacy access systems must be used as-is. To make intelligent business decisions, users must manually login, navigate, and search each of these disparate access systems to gather enough information to make decisions or approvals related to a product, a customer, a proposal, a claim, or another item of interest. The process is slow, susceptible to data entry errors, and presents a frustrating experience for users, particularly when working with large datasets.

SUMMARY

A computing device comprises one or more processors and one or more memories storing instructions. When the instructions are processed by the one or more processors, the computing device sends a request identifying a user account and the one or more services. The computing device receives, in response to the request, automation code for accessing the one or more services. The computing device retrieves credentials for accessing the one or more services by the user account. The computing device executes the automation code to cause the user account to be authenticated at the one or more services using the credentials and to cause a search of the query to be performed at the one or more services. The computing device outputs a result of the automation code, the result corresponding to one or more matches of the search of the query at the one or more services.

The aforementioned approaches may also be implemented by one or more computer-implemented processes and non-transitory computer-readable media that store instructions which, when processed by one or more processed, implement the approach.

BRIEF DESCRIPTION OF THE DRAWINGS

Embodiments are depicted by way of example, and not by way of limitation, in the figures of the accompanying drawings and in which like reference numerals refer to similar elements.

FIG. 3 is a diagram that depicts example pseudocode for automation code scripts.

FIG. 4 is a flow diagram that depicts an approach for implementing browser based robotic process automation.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. Device Architecture
  A. Computing Device with Browser Automation Plugin
  B. Automation Plugin Manager
III. Automation Plugin Processes
  A. Initial Configuration
  B. Query Submission
  C. Outputting Results
IV. Implementation Examples
V. Additional Examples

I. Overview

An approach is provided for browser based robotic process automation. A computing device accepts, via a user interface, a selection of a query and one or more services. The computing device sends a request identifying a user account and the one or more services. The computing device receives, in response to the request, automation code for accessing the one or more services. The computing device retrieves credentials for accessing the one or more services by the user account. The computing device executes the automation code to cause the user account to be authenticated at the one or more services using the credentials and to cause a search of the query to be performed at the one or more services. The computing device outputs a result of the automation code, the result corresponding to one or more matches of the search of the query at the one or more services.

The approach described herein for providing browser based robotic process automation provides a technical solution to the technical problem of how to perform automated searches using disparate access systems and gathering the results in a readily actionable manner for analysis, decision making, and other tasks. The technical solution allows the searches to be carried out in an automated manner without requiring manual login, navigation, and searching of the disparate access systems, thereby reducing risk of human error and greatly accelerating speed of obtaining actionable data results.

II. Device Architecture

Figure 1:
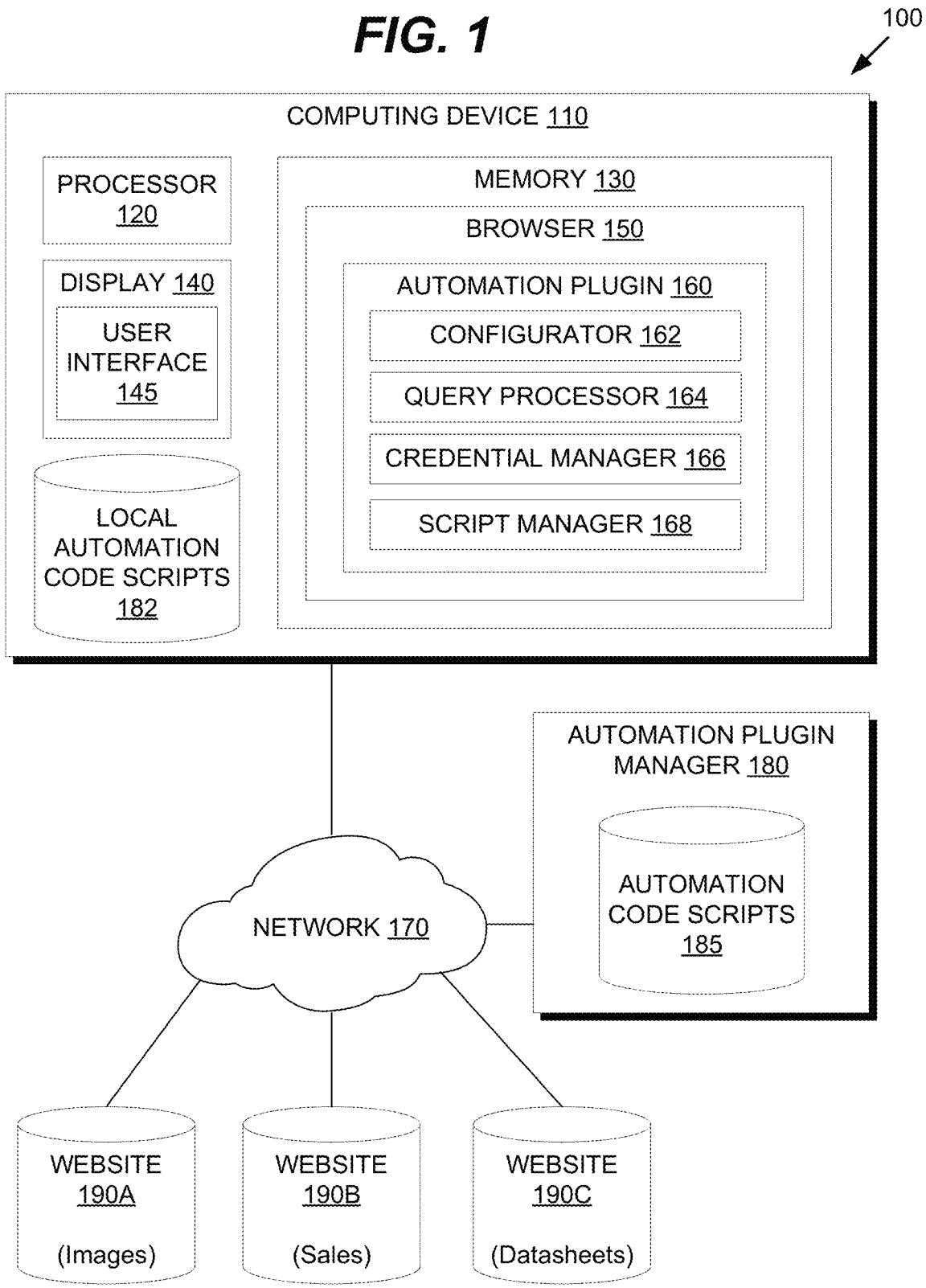
FIG. 1 is a block diagram that depicts a system for implementing browser based robotic process automation, as described herein.

FIG. 1 is a block diagram that depicts a system 100 for implementing browser based robotic process automation. System 100 includes computing device 110, network 170, automation plugin manager 180, website 190A, website 190B, and website 190C. Computing device 110 includes processor 120, memory 130, display 140, and local automation code scripts 182. Memory 130 includes browser 150, which includes automation plugin 160. Display 140 includes user interface 145. Automation plugin 160 includes configurator 162, query processor 164, credential manager 166, and script manager 168. While not specifically shown in FIG. 1, components of computing device 110 may communicate via one or more data buses.

The elements of system 100 may be communicatively coupled via one or more wireless and/or wired computer networks of any type, such as network 170, and/or direct communications links that are not depicted in FIG. 1 for purposes of explanation. System 100 may include additional or fewer elements, depending upon a particular implementation. The approach for configuring system 100 is described in the context of configuring a single computing device 110 accessing websites 190A-190C for purposes of explanation, but embodiments are applicable to configuring any number of computing devices to access any number of websites.

A. Computing Device with Browser Automation Plugin

Computing device 110 may correspond to a tablet, laptop, desktop, smartphone, or other computing device that can execute browser 150, which may correspond to a web browser that can view and interact with webpages accessible via network 170. A user interface of browser 150 may be shown within user interface 145 of display 140. To provide browser 150 with robotic process automation capabilities, automation plugin 160 may be installed into browser 150 as a plugin or extension. Automation plugin 160 may communicate with automation plugin manager 180 to manage and maintain local automation code scripts 182.

Automation plugin 160 may contain several components, as shown. Configurator 162 enables the user to obtain preconfigured and validated scripts, customize local automation code scripts 182 according to the user's needs, and otherwise manage various configuration settings of automation plugin 160. Further, for users with administrative privileges, new scripts may be generated and recorded for submission to automation plugin manager 180.

Query processor 164 provides an interface by which the user can select portions of a website, such as text or images, to define as a query for a selected automation code script. For example, query processor 164 may provide script entries in a right click contextual menu when a portion of a website is selected or highlighted in user interface 145 corresponding to browser 150. Query processor 164 may also perform any necessary conversion and pre-processing of the query according to the search capabilities of the website domains specified in the automation code scripts.

Credential manager 166 may manage user credentials for logging into various domains accessed by the automation code scripts. The user credentials can be obtained in various ways, including but not limited to: by directly prompting the user for the credentials to be encrypted and stored locally, by using stored cookies or a password manager of browser 150, or by securely accessing a remote authentication service provided by automation plugin manager 180 or another service.

Script manager 168 may manage execution of the local automation code scripts 182. This may include inserting search queries from query processor 164 and credentials from credential manager 166 into local automation code scripts 182 prior to execution. Script manager 168 may also perform validation and verify signatures to ensure that local automation code scripts 182 are safe and not tampered. After execution of local automation code scripts 182, one or more websites 190A-190C may be scraped of data corresponding to the search query results, which may be further formatted and presented to the user. For example, websites may be generated and shown in new browser tabs or windows, report documents may be generated for viewing, text entry fields may be automatically populated, and other tasks may be performed.

The computing device 110 includes a processor 120, a memory 130, and a browser 150. The processor 120 may be implemented by one or more microprocessors and associated computer hardware and/or computer software. The memory 130 may be implemented by volatile memory, non-volatile memory, or any combination of volatile and non-volatile memory. The browser 150 may be a compiled or interpreted application executing on any type of operating system that may vary depending upon a particular implementation.

B. Automation Plugin Manager

The automation plugin manager 180 may correspond to a server that maintains automation code scripts 185 for distribution to local storage on computing devices, such as within local automation code scripts 182 of computing device 110. The automation code scripts may be time-stamped and digitally signed to prevent tampering. To generate the scripts, an administrator may, for example, use configurator 162 to generate a script by recording actions performed by the administrator in browser 150. The recorded actions can then be repeated by executing the generated script. Portions of the generated script may also be generalized. For example, the generated script may not store the specific credentials provided during the recording, but rather indicate that user credentials are required for website access. The scripts may also be generated by programming the script from scratch, or by modifying an existing recorded script.

Based on specific use cases and user needs, a user may utilize configurator 162 of automation plugin 160 to access automation plug manager 180 and download relevant scripts from automation code scripts 185 for storage into local automation code scripts 182. Administrators may update scripts to fix bugs and issues, to provide new features, or to accommodate changes to website domains that necessitate different access patterns. Automation plugin 160 may therefore periodically query automation plugin manager 180 to download updated scripts, for example by comparing timestamps of scripts stored in local automation code scripts 182 versus timestamps of scripts stored in automation code scripts 185. Alternatively, automation plugin manager 180 may provide push updates for specific scripts to automation plugins that are subscribed for updates.

In some implementations, local caching of automation code scripts may be disabled for automation plugin 160. Accordingly, local automation code scripts 182 may be omitted on computing device 110, and requests for automation code scripts may instead be sent directly to automation plugin manager 180 to retrieve the latest scripts from automation code scripts 185 on demand. In this case, script manager 168 may store filenames or other identifiers of the scripts to be used instead of maintaining local copies of the scripts in local automation code scripts 182.

III. Automation Plugin Processes

The approach described herein for browser based robotic process automation provides for initial configuration of automation plugins, selection of an automation code script to scrape data from selected services or websites using a query selected from browser content, and execution of the selected automation code script using the query and credentials for an associated user. Embodiments are depicted in the figures and described herein in the context of system 100, but embodiments are not limited to this example.

A. Initial Configuration

Initial configuration of an automation plugin is performed via configurator 162 as described above. For example, the user of computing device 110 may be a product stock manager at a company, and therefore the user is interested in downloading scripts that will help with decisions regarding the type and quantity of products to restock. This is only one example use case; other use cases may involve, for example, accounts receivable departments, accounts payable departments, analytic dashboard users, company data scientists, insurance adjustors, and other users. Thus, depending on the use case, the user can select relevant scripts to assist in decision making. In some implementations, an administrator may preload specific scripts for automation plugins installed at specific workstations or for specific users or user groups.

For example, a user may utilize configurator 162 to access a list of available automation code scripts 185, which may be presented to the user according to applicable services or website domains, use cases, or other categorizations. For example, referring to FIG. 3, the user may select and download automation code script "get_images_by_id.script" corresponding to automation script pseudocode 300A and "show_me_results1.script" corresponding to automation script pseudocode 300B from automation code scripts 185 for storage into local automation code scripts 182. Once the scripts are downloaded, automation plugin 160 may detect the scripts and present the scripts as selectable entries in contextual menus of browser 150, as described further below in conjunction with FIG. 2A.

B. Query Submission

Figure 2A:
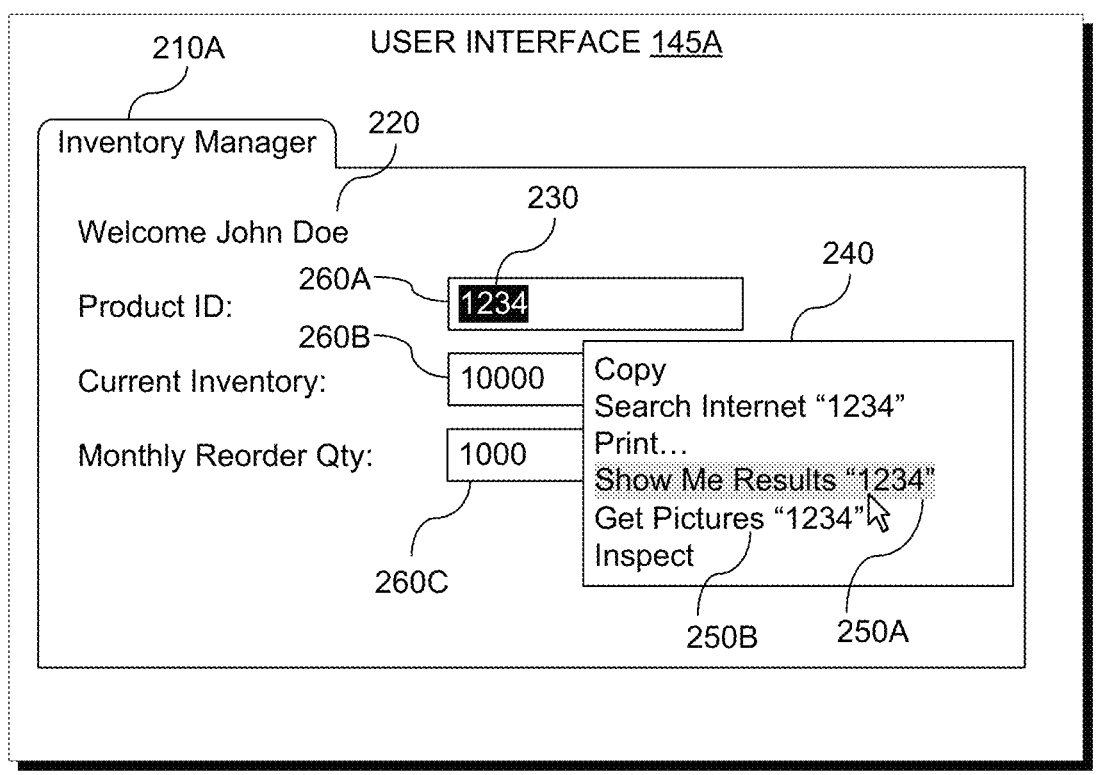
FIG. 2A is a diagram that depicts an example graphical user interface (GUI) of a browser displaying a contextual menu with entries inserted by an automation plugin to submit queries for performing browser based robotic process automation.

FIG. 4 is a flow diagram 400 that depicts an approach for implementing browser based robotic process automation. Starting in step 402, query processor 164 of automation plugin 160 executing on processor 120 accepts, via user interface 145, a selection of a query and one or more services. For example, FIG. 2A is a diagram that depicts an example user interface 145A of browser 150 displaying a contextual menu 240 with entry 250A and entry 250B inserted by automation plugin 160 to submit queries for performing browser based robotic process automation. As shown in FIG. 2A, a single browser tab 210A is shown, and a welcome message 220 is shown identifying the logged in user as "John Doe". This user may be the same user that previously used configurator 162 to configure automation plugin 160 and provide user credentials to credential manager 166. Text entry fields 260A, 260B, and 260C are also shown, corresponding to a Product ID, Current Inventory, and Monthly Reorder Qty, respectively.

In this example, the user "John Doe" may be interested in obtaining additional information regarding Product ID "1234" to determine whether to adjust the amount of product to restock, or the Monthly Reorder Qty in text entry field 260C. Accordingly, the user may select or highlight text 230 in text entry field 260A, wherein text 230 corresponds to "1234". This may, for example, correspond to a stock-keeping unit (SKU), universal product code (UPC), or another identifier.

While the example shown in FIG. 2A uses text 230 as the selected query, the user may also select non-text content such as an image or a video. The non-text query may be used as-is if the selected services support searching of non-text content, such as by reverse image or video search. When the selected services do not support searching of non-text content, then the query may be converted into a format that is searchable by the selected services, such as by converting the non-text query into a text query. For example, metadata associated with the image or video may be examined for text that can be used as a query. In another example, an additional search may be performed using the non-text query to determine an associated text query. Thus, the query can be pre-processed into a format searchable by the selected services.

After selecting text 230, the user may, for example, right click to open contextual menu 240, which provides several entries to interact with text 230, including entry 250A for executing "show_me_results1.script" with "1234" as the query, or entry 250B for executing "get_images_by_id.script" with "1234" as the query. As shown in FIG. 2A, the user may select entry 250A. Since entry 250A corresponds to "show_me_results1.script" as shown in FIG. 3, the selection of entry 250A selects three services: website 190A ("get_images_by_id.script"), web site 190B ("get_sales_by_id.script"), and web site 190C ("get_datasheet_by_id.script").

In some implementations, the query may be submitted automatically based on a detection of a current website or application displaying in user interface 145 of browser 150. For example, a web site may be matched to pre-defined criteria such as matching to at least portions of a specific URL, a specific domain or subdomain, or other criteria. Once a matched web site is rendered in user interface 145, a defined text entry field, text portion, image, or other element of the webpage may be automatically selected as the query, and an associated script may be automatically selected with the query for execution with the query. In this manner, step 402 may proceed automatically without user input, thereby omitting the manual highlighting of the query and the manual selection of the script via contextual menu 240, as described above.

In step 404, query processor 164 executing on processor 120 sends a request identifying a user account, e.g. "John Doe", and the one or more services selected from step 402, or the "show_me_results1.script" accessing websites 190A-190C. For example, the request may be sent to credential manager 166.

In step 406, query processor 164 of automation plugin 160 executing on processor 120 receives, in response to the request, automation code for accessing websites 190A-190C. For example, the request in step 404 may also be sent to script manager 168. Script manager 168 may then retrieve the selected "show_me_results1.script" and any nested scripts, such as "get_images_by_id.script", "get_sales_by_id.script", and "get_datasheet_by_id.script" from local automation code scripts 182, which respectively access websites 190A, 190B, and 190C. Alternatively, the request may be sent directly to automation plugin manager 180 for downloading the automation code on demand from automation code scripts 185.

In step 408, credential manager 166 of automation plugin 160 executing on processor 120 retrieves credentials for accessing websites 190A-190C by the "John Doe" user account, as indicated in the request from step 404. For example, credential manager 166 may access a locally maintained store of credentials, access credentials available to browser 150 such as a cookie store or password manager, or access credentials available on a service hosted on automation plugin manager 180, or another remote authentication service. When the credentials are retrieved from automation plugin manager 180, the credentials may be retrieved together with the automation code in step 406. If credentials for some of the one or more services do not exist, the user may be prompted to provide the credentials via an interactive authentication prompt, and the credentials can then be verified, encrypted, and securely stored for future use.

In step 410, script manager 168 of automation plugin 160 executing on processor 120 executes the automation code received from step 406, or "show_me_results1.script" to cause the "John Doe" user account to be authenticated at websites 190A-190C using the credentials from step 408 and to cause a search of "1234" to be performed at websites 190A-190C. For example, referring to FIG. 3, the steps 330-336 of automation script pseudocode 300B may be executed, which in turn execute steps 310-328 of automation script pseudocode 300A ("get_images_by_id.script") and steps for "get_sales_by_id.script" and "get_datasheet_by_id.script", which are not specifically shown but may be structured similarly to automation script pseudocode 300A.

As shown in automation script pseudocode 300A, a robotic process automation is defined wherein browser interactions are automatically performed to login to the website, perform a search using an input query, and return a formatted result. The steps of automation script pseudocode 300A for "get_images_by_id.script" will be described in relation to FIG. 2C-2G, but a similar process may also be carried out for other scripts such as "get_sales_by_id.script" and "get_datasheet_by_id.script".

Figure 2B:
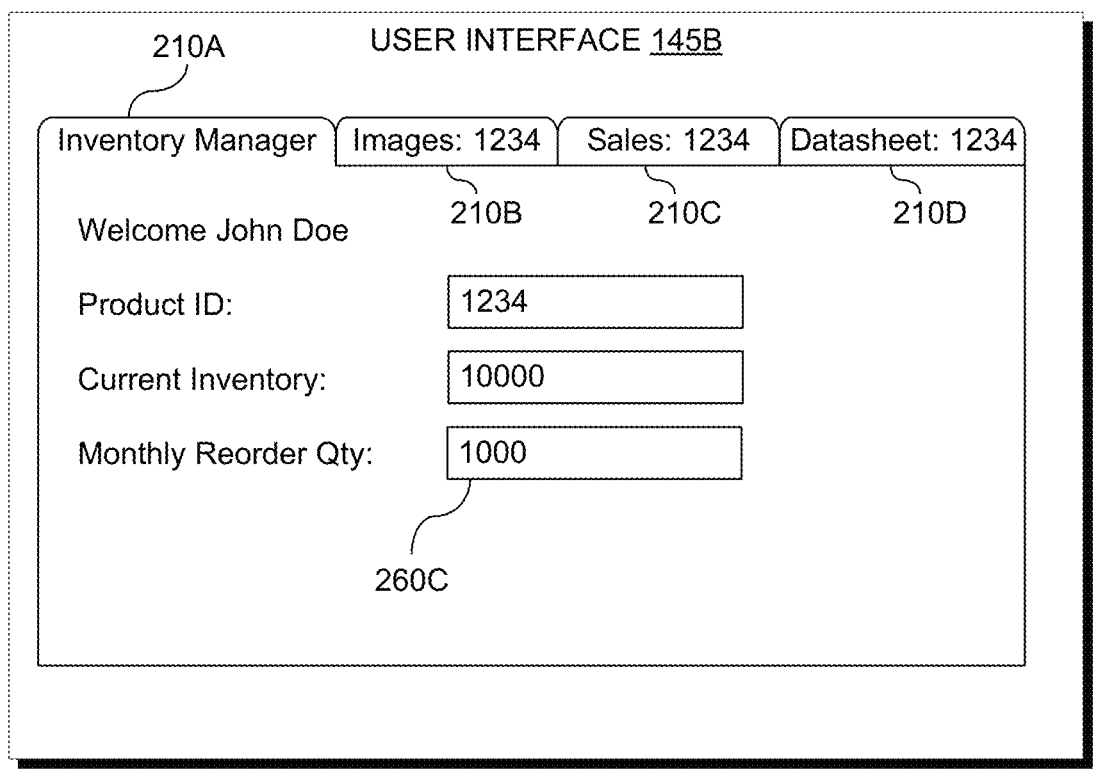
FIG. 2B is a diagram that depicts an example GUI of the browser of FIG. 2A after performing the browser based robotic process automation.
Figure 2C:
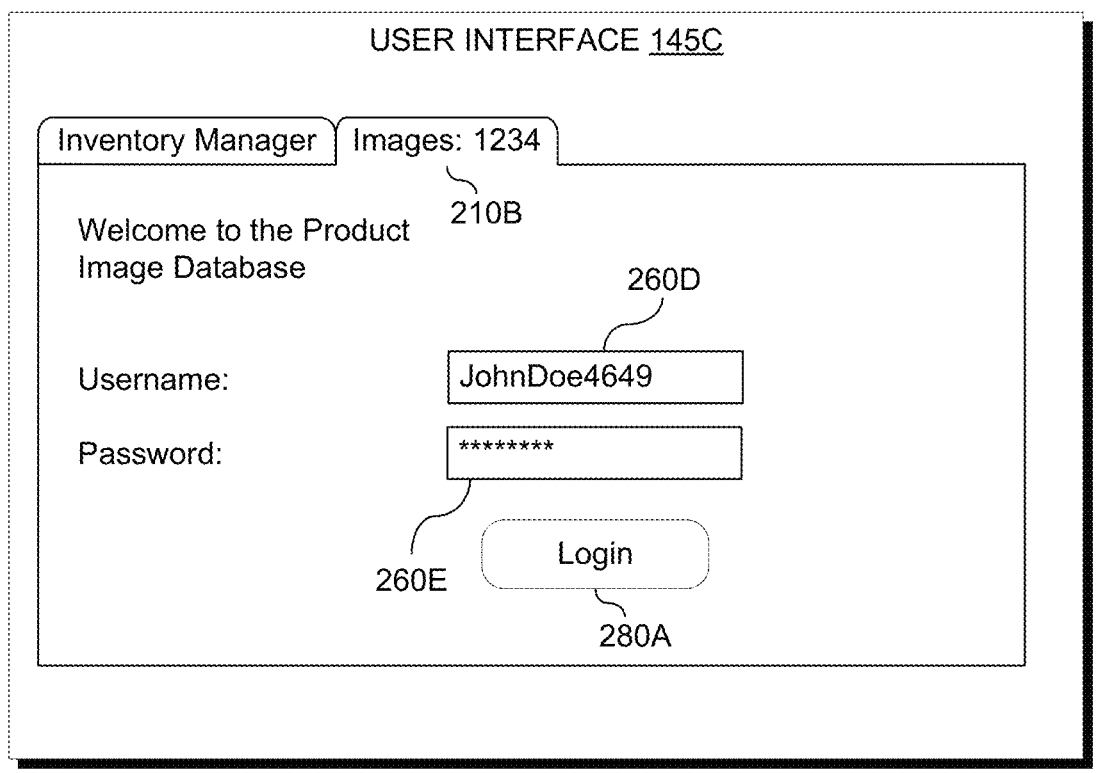
FIG. 2C is a diagram that depicts an example GUI of a browser displaying a login screen for an access system.

For example, referring to FIG. 2C, steps 310, 312, and 314 may be performed in browser tab 210B, wherein text entry fields 260D and 260E are populated with the credentials of "John Doe" or "JohnDoe4649" for website 190A, and button 280A is clicked to initiate a login. In some implementations, these steps may instead extend an existing login session, for example by presenting session cookies or an encoded session URL to website 190A.

Figure 2D:
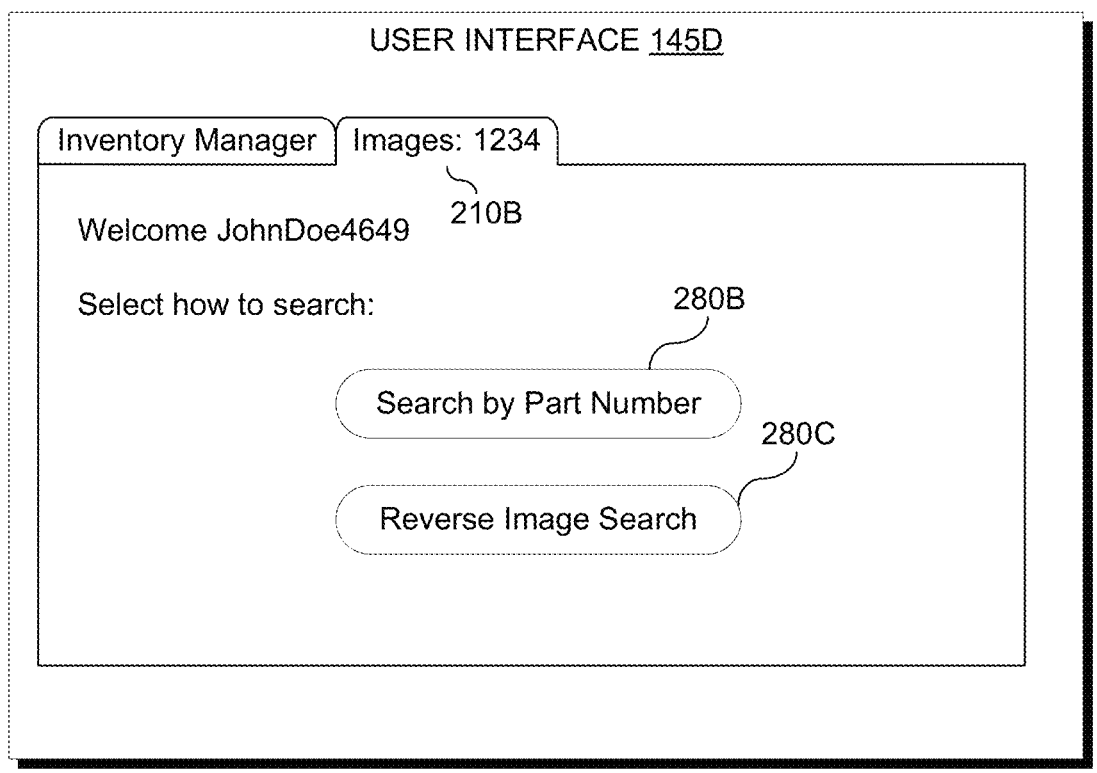
FIG. 2D is a diagram that depicts an example GUI of the browser of FIG. 2C after a successful login, wherein a search screen is displayed.

Referring to FIG. 2D, step 316 may be performed in browser tab 210B, wherein button 280B is clicked to proceed with a search by part ID. As shown in FIG. 2D, a reverse image search is also possible by clicking on button 280C, and this option may be used when an automation code script supports selection of image queries.

Figure 2E:
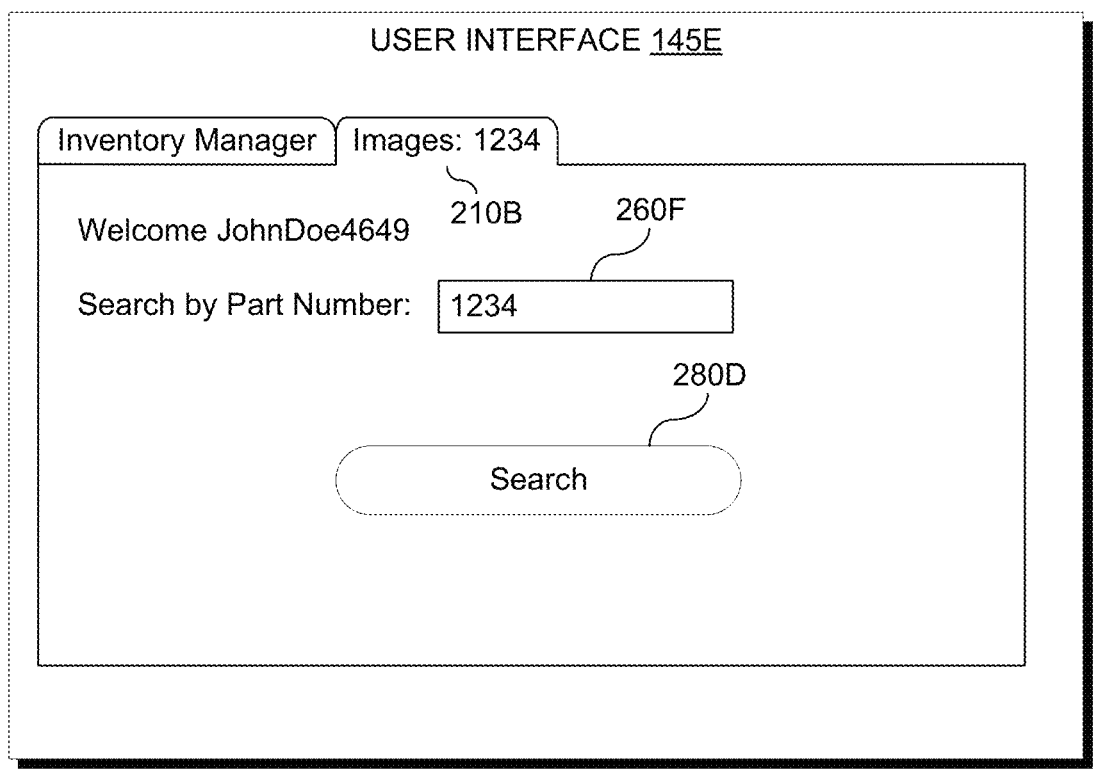
FIG. 2E is a diagram that depicts an example GUI of the browser of FIG. 2D after selecting a search type, wherein a search entry screen is displayed.

Referring to FIG. 2E, steps 318 and 320 may be performed in browser tab 210B, wherein the search query of "1234" is inserted into text entry field 260F and button 280D is clicked to initiate the search.

Figure 2F:
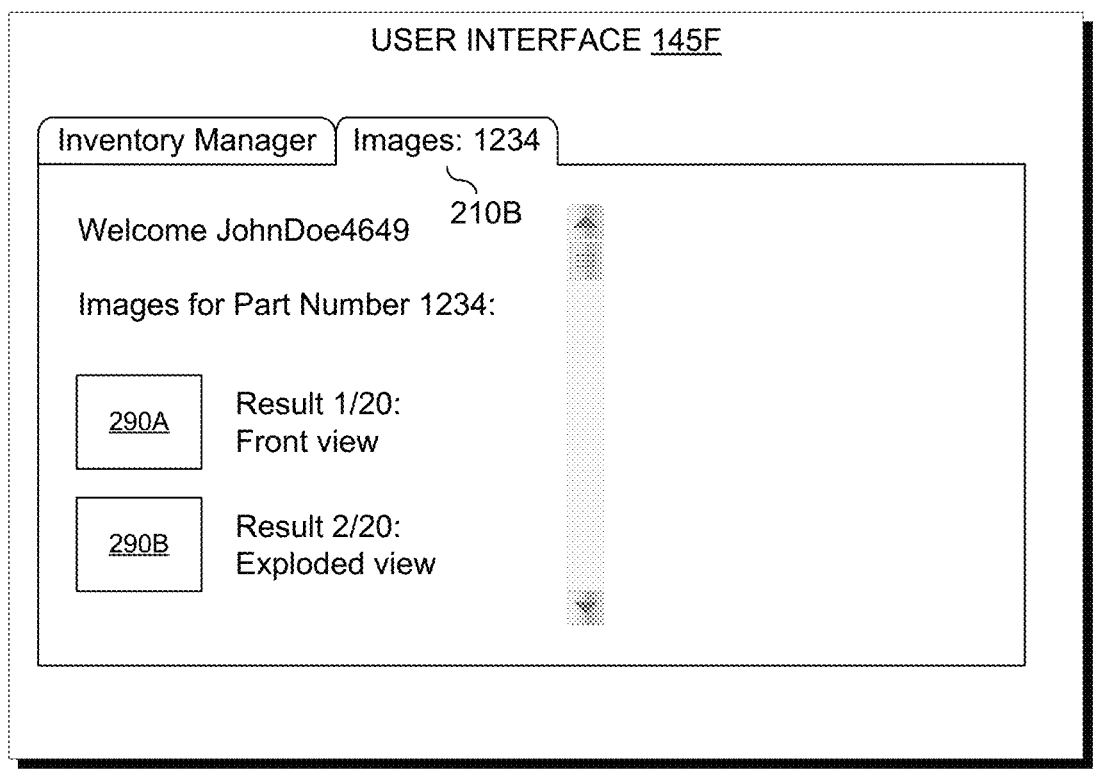
FIG. 2F is a diagram that depicts an example GUI of the browser of FIG. 2E after submitting a search query, wherein a result screen is displayed with image thumbnail links.

Referring to FIG. 2F, step 322 may be performed in browser tab 210B, wherein each of the thumbnail links 290A, 290B, and so forth are scraped for full-size images.

Figure 2G:
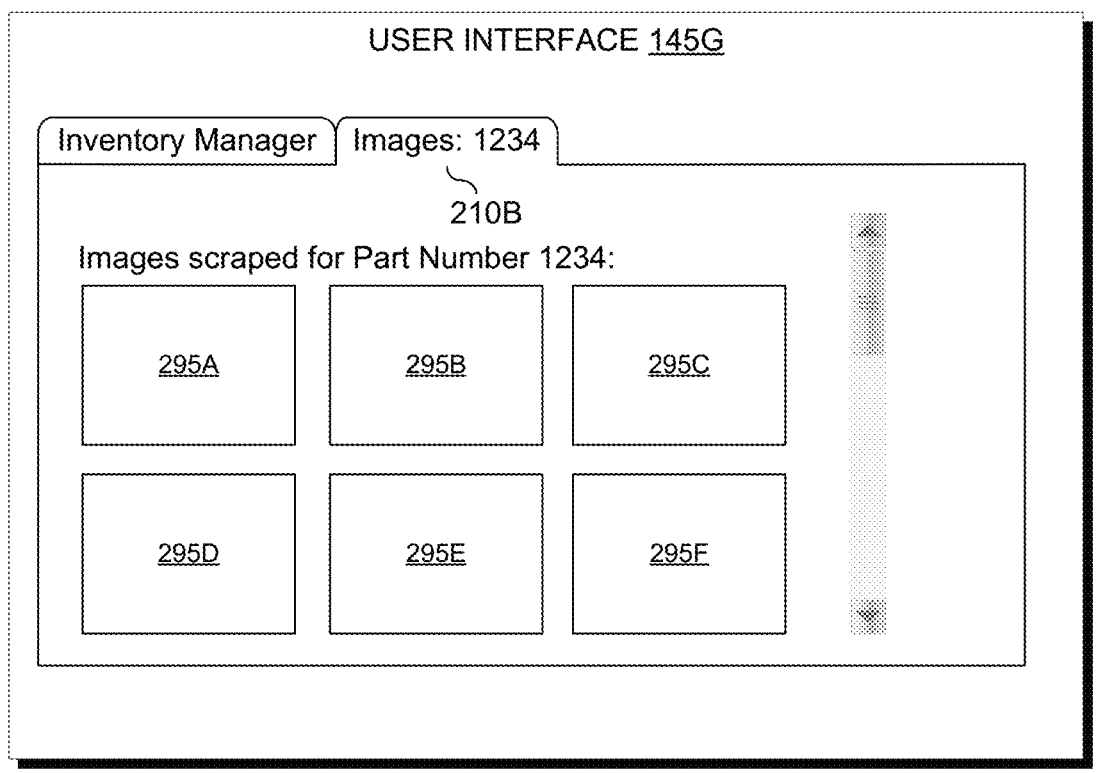
FIG. 2G is a diagram that depicts an example GUI of the browser of FIG. 2F after scraping the image thumbnail links, wherein a result screen is displayed with full size images.

Referring to FIG. 2G, steps 324 and 326 may be performed in browser tab 210B, wherein full-size images scraped from respective thumbnail links in FIG. 2F are arranged in a grid and presented in browser tab 210B, which includes images 295A-295F. For example, the previous steps 310-322 illustrated by FIG. 2C-2F may be performed in a silent manner without displaying the browser interactions onscreen, and browser tab 210B in FIG. 2G may be the first result that is visible to the user.

C. Outputting Results

In step 412, script manager 168 of automation plugin 160 executing on processor 120 outputs the result from step 410, wherein the result corresponds to one or more matches of the "1234" search at websites 190A-190C performed in step 410. The result may be output to new browser tabs, output to new browser windows, saved as local files formatted as a Word document or a Portable Document Format (PDF), or sent to a printer or printing device accessible to computing device 110. For example, referring to FIG. 2B, the output of the "get_images_by_id.script" script may be output to new browser tab 210B, the output of the "get_sales_by_id.script" script may be output to new browser tab 210C, and the output of the "get_datasheet_by_id.script" script may be output to new browser tab 210D. In some implementations, the result may be used to populate one or more data entry fields in user interface 145 of browser 150.

Thus, after the completion of flow diagram 400, the user can switch between browser tabs 210B-210D to view product images, sales and pricing data, and datasheets that are relevant for the product ID "1234". For example, the images may assist in visualization of the product and its construction, sales and pricing data may assist in evaluating market share, profit, and future sales prospects, and datasheets may assist in determining whether the "1234" product line is supported or discontinued and whether a substitute or replacement part is available. Based on viewing the information presented in browser tabs 210B-210D, the user can make an informed decision whether to modify text entry field 260C in browser tab 210A to change the quantity of future restocks for the "1234" product.

IV. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
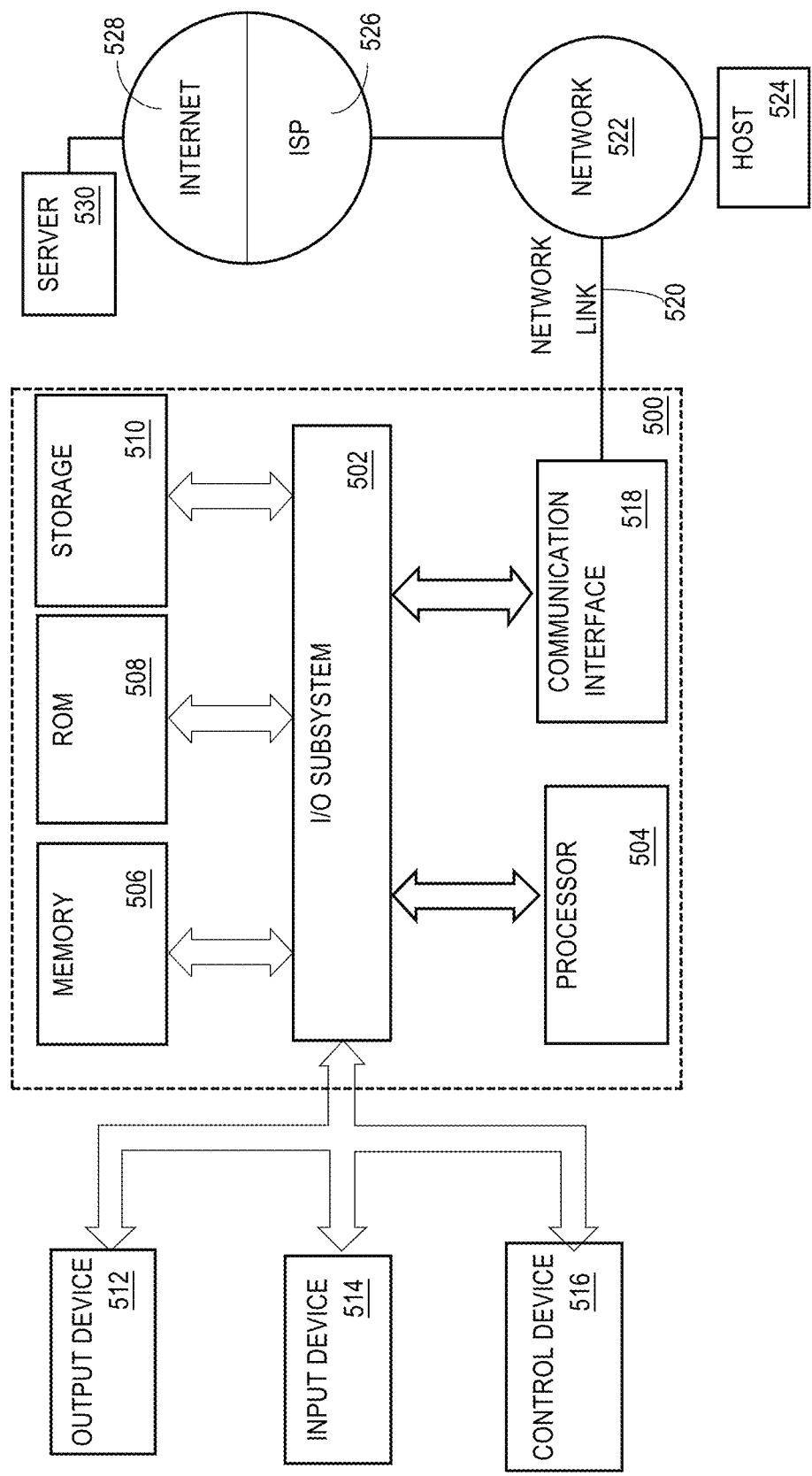
FIG. 5 is a block diagram that depicts an example computer system upon which embodiments may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device.

An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

V. Additional Examples

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

A first clause is a computing system, the computing system including a computing device including one or more processors, and one or more memories storing instructions which, when processed by the one or more processors, cause: accepting, via a user interface, a selection of a query and one or more services; sending a request identifying a user account and the one or more services; receiving, in response to the request, automation code for accessing the one or more services; retrieving credentials for accessing the one or more services by the user account; executing the automation code to cause the user account to be authenticated at the one or more services using the credentials and to cause a search of the query to be performed at the one or more services; and outputting a result of the automation code, the result corresponding to one or more matches of the search of the query at the one or more services.

A further clause is the computing system of the first clause, wherein the query comprises text.

A further clause is the computing system of the first clause, wherein the query comprises an image.

A further clause is the computing system of the first clause, wherein the instructions, when processed by the one or more processors, cause the query to be converted into a format searchable by the one or more services prior to executing the automation code.

A further clause is the computing system of the first clause, wherein the instructions, when processed by the one or more processors, cause the query to be converted into a format searchable by the one or more services prior to executing the automation code, the conversion using at least one of: metadata associated with the query, or results from an additional search using the query.

A further clause is the computing system of the first clause, wherein the instructions, when processed by the one or more processors, cause accepting, via the user interface comprising a browser tab or window, the selection of the query by a selection of content displayed in the browser tab or window.

A further clause is the computing system of the first clause, wherein the instructions, when processed by the one or more processors, cause accepting, via the user interface, the selection of the one or more services from a single entry in a list of search options presented after the selection of the query.

A further clause is the computing system of the first clause, wherein the instructions, when processed by the one or more processors, cause sending the request to a server, and receiving the automation code from the server.

A further clause is the computing system of the first clause, wherein the instructions, when processed by the one or more processors, cause retrieving of the credentials together with the automation code.

A further clause is the computing system of the first clause, wherein the instructions, when processed by the one or more processors, cause retrieving of the credentials from at least one of: a browser cache, a cookie store, a password manager, or an interactive authentication prompt.

A further clause is the computing system of the first clause, wherein the instructions, when processed by the one or more processors, cause outputting the result to one or more new browser tabs or windows in the user interface.

A further clause is the computing system of the first clause, wherein the instructions, when processed by the one or more processors, cause outputting the result to one or more data entry fields in the user interface.

A further clause is the computing system of the first clause, wherein the instructions, when processed by the one or more processors, cause outputting the result to a file stored on the computing device or a printer accessible to the computing device.

A second clause is one or more non-transitory computer-readable media storing instructions which, when processed by one or more processors cause: accepting, via a user interface, a selection of a query and one or more services; sending a request identifying a user account and the one or more services; receiving, in response to the request, automation code for accessing the one or more services; retrieving credentials for accessing the one or more services by the user account; executing the automation code to cause the user account to be authenticated at the one or more services using the credentials and to cause a search of the query to be performed at the one or more services; and outputting a result of the automation code, the result corresponding to one or more matches of the search of the query at the one or more services.

A further clause is the one or more non-transitory computer-readable media of the second clause, wherein the query comprises text.

A further clause is the one or more non-transitory computer-readable media of the second clause, wherein the query comprises an image.

A further clause is the one or more non-transitory computer-readable media of the second clause, wherein the instructions, when processed by the one or more processors, cause the query to be converted into a format searchable by the one or more services prior to executing the automation code.

A further clause is the one or more non-transitory computer-readable media of the second clause, wherein the instructions, when processed by the one or more processors, cause the query to be converted into a format searchable by the one or more services prior to executing the automation code, the conversion using at least one of: metadata associated with the query, or results from an additional search using the query.

A further clause is the one or more non-transitory computer-readable media of the second clause, wherein the instructions, when processed by the one or more processors, cause accepting, via the user interface comprising a browser tab or window, the selection of the query by a selection of content displayed in the browser tab or window.

A further clause is the one or more non-transitory computer-readable media of the second clause, wherein the instructions, when processed by the one or more processors, cause accepting, via the user interface, the selection of the one or more services from a single entry in a list of search options presented after the selection of the query.

A further clause is the one or more non-transitory computer-readable media of the second clause, wherein the instructions, when processed by the one or more processors, cause sending the request to a server, and receiving the automation code from the server.

A further clause is the one or more non-transitory computer-readable media of the second clause, wherein the instructions, when processed by the one or more processors, cause retrieving of the credentials together with the automation code.

A further clause is the one or more non-transitory computer-readable media of the second clause, wherein the instructions, when processed by the one or more processors, cause retrieving of the credentials from at least one of: a browser cache, a cookie store, a password manager, or an interactive authentication prompt.

A further clause is the one or more non-transitory computer-readable media of the second clause, wherein the instructions, when processed by the one or more processors, cause outputting the result to one or more new browser tabs or windows in the user interface.

A further clause is the one or more non-transitory computer-readable media of the second clause, wherein the instructions, when processed by the one or more processors, cause outputting the result to one or more data entry fields in the user interface.

A further clause is the one or more non-transitory computer-readable media of the second clause, wherein the instructions, when processed by the one or more processors, cause outputting the result to a stored file or an accessible printer.

A third clause is a computer-implemented method comprising: accepting, via a user interface, a selection of a query and one or more services; sending a request identifying a user account and the one or more services; receiving, in response to the request, automation code for accessing the one or more services; retrieving credentials for accessing the one or more services by the user account; executing the automation code to cause the user account to be authenticated at the one or more services using the credentials and to cause a search of the query to be performed at the one or more services; and outputting a result of the automation code, the result corresponding to one or more matches of the search of the query at the one or more services.

A further clause is the computer-implemented method of the third clause, wherein the query comprises text.

A further clause is the computer-implemented method of the third clause, wherein the query comprises an image.

A further clause is the computer-implemented method of the third clause, further comprising converting the query into a format searchable by the one or more services prior to executing the automation code.

A further clause is the computer-implemented method of the third clause, further comprising converting the query into a format searchable by the one or more services prior to executing the automation code, the conversion using at least one of: metadata associated with the query, or results from an additional search using the query.

A further clause is the computer-implemented method of the third clause, wherein accepting, via the user interface comprising a browser tab or window, the selection of the query is by a selection of content displayed in the browser tab or window.

A further clause is the computer-implemented method of the third clause, wherein accepting, via the user interface, the selection of the one or more services is from a single entry in a list of search options presented after the selection of the query.

A further clause is the computer-implemented method of the third clause, wherein sending the request is to a server, and wherein receiving the automation code is from the server.

A further clause is the computer-implemented method of the third clause, wherein retrieving the credentials is performed together with receiving the automation code.

A further clause is the computer-implemented method of the third clause, wherein retrieving the credentials is from at least one of: a browser cache, a cookie store, a password manager, or an interactive authentication prompt.

A further clause is the computer-implemented method of the third clause, wherein outputting the result is to one or more new browser tabs or windows in the user interface.

A further clause is the computer-implemented method of the third clause, wherein outputting the result is to one or more data entry fields in the user interface.

A further clause is the computer-implemented method of the third clause, wherein outputting the result is to a stored file or an accessible printer.

The invention claimed is:

1. A computing device comprising:
   one or more processors; and
   one or more memories storing instructions which, when processed by the one or more processors, cause:
      accepting, via a user interface, a selection of a query and a particular action of a plurality of actions, wherein the particular action is associated with a particular automation code script to be executed with respect to the query;
      identifying one or more services associated with the particular automated code script;
      sending a request identifying a user account and the one or more services;
      receiving, in response to the request, the particular automation code script, wherein the particular automation code script records one or more actions performed by a user in a browser;
      retrieving credentials for accessing the one or more services by the user account;
      executing the particular automation code script, which comprises the credentials and the query, to cause the user account to be authenticated at the one or more services using the credentials and to cause a search of the query to be performed at the one or more services; and
      outputting a result of the particular automation code script, the result corresponding to one or more matches of the search of the query at the one or more services.

2. The computing device of claim 1, wherein the query comprises text.

3. The computing device of claim 1, wherein the query comprises an image.

4. The computing device of claim 1, wherein the instructions, when processed by the one or more processors, cause the query to be converted into a format searchable by the one or more services prior to executing the particular automation code script.

5. The computing device of claim 4, wherein the instructions, when processed by the one or more processors, cause the query to be converted into the format searchable by the one or more services by using at least one of: metadata associated with the query, or results from an additional search using the query.

6. The computing device of claim 1, wherein the instructions, when processed by the one or more processors, cause accepting, via the user interface comprising a browser tab or window, the selection of the query by a selection of content displayed in the browser tab or window.

7. The computing device of claim 1, wherein the instructions, when processed by the one or more processors, cause accepting, via the user interface, the selection of the particular action from a single entry in a list of search options presented after the selection of the query.

8. The computing device of claim 1, wherein the instructions, when processed by the one or more processors, cause sending the request to a server, and receiving the particular automation code script from the server.

9. The computing device of claim 1, wherein the instructions, when processed by the one or more processors, cause retrieving of the credentials from at least one of: a browser cache, a cookie store, a password manager, or an interactive authentication prompt.

10. The computing device of claim 1, wherein the instructions, when processed by the one or more processors, cause outputting the result to one or more new browser tabs or windows in the user interface.

11. The computing device of claim 1, wherein the instructions, when processed by the one or more processors, cause outputting the result to one or more data entry fields in the user interface.

12. The computing device of claim 1, wherein the instructions, when processed by the one or more processors, cause outputting the result to a file stored on the computing device or a printer accessible to the computing device.

13. One or more non-transitory computer-readable media storing instructions which, when processed by one or more processors cause:
   accepting, via a user interface, a selection of a query and a particular action of a plurality of actions, wherein the particular action is associated with a particular automation code script to be executed with respect to the query;
   identifying one or more services associated with the particular automation code script;
   sending a request identifying a user account and the one or more services;
   receiving, in response to the request, the particular automation code script, wherein the particular automation code script records one or more actions performed by a user in a browser;
   retrieving credentials corresponding to the one or more services by the user account;
   executing the particular automation code script, which comprises the credentials and the query, to cause the user account to be authenticated at the one or more services using the credentials and to cause a search of the query to be performed at the one or more services; and
   outputting a result of the particular automation code script, the result corresponding to one or more matches of the search of the query at the one or more services.

14. The one or more non-transitory computer-readable media of claim 13, wherein the instructions, when processed by the one or more processors, cause the query to be converted into a format searchable by the one or more services prior to executing the particular automation code script, and wherein converting into the format uses at least one of: metadata associated with the query, and results from an additional search using the query.

15. The one or more non-transitory computer-readable media of claim 13, wherein the instructions, when processed by the one or more processors, cause accepting, via the user interface, the selection of the particular action from a single entry in a list of search options presented after the selection of the query.

16. The one or more non-transitory computer-readable media of claim 13, wherein the instructions, when processed by the one or more processors, cause outputting the result to at least one of:
- one or more new browser tabs or windows in the user interface;
- one or more data entry fields in the user interface;
- a stored file; and
- an accessible printer.

17. A computer-implemented method comprising:
- accepting, via a user interface, a selection of a query and a particular action of a plurality of actions, wherein the particular action is associated with a particular automation code script to be executed with respect to the query;
- identifying one or more services associated with the particular automation code script;
- sending a request identifying a user account and the one or more services;
- receiving, in response to the request, the particular automation code script, wherein the particular automation code script records one or more actions performed by a user in a browser;
- retrieving credentials corresponding to the one or more services by the user account;
- executing the particular automation code script, which comprises the credentials and the query, to cause the user account to be authenticated at the one or more services using the credentials and to cause a search of the query to be performed at the one or more services; and
- outputting a result of the particular automation code script, the result corresponding to one or more matches of the search of the query at the one or more services.

18. The computer-implemented method as recited in claim 17, wherein accepting, via the user interface, the selection of the particular action comprises accepting a single entry in a list of search options presented after the selection of the query.

19. The computing device of claim 1, wherein the selection of the query is associated with a current website being accessed and one or more services, wherein the query is selected based on the current website being accessed or an application displayed via the user interface, the current website being accessed being matched to pre-defined criteria based on characteristics of the current website being accessed.

20. The computing device of claim 1, further comprising receiving one or more nested automation code scripts for performing one or more other actions performed by the user in the browser.

* * * * *